United States Patent Office 3,594,427
Patented July 20, 1971

3,594,427
ADAMANTANE BISPHENOLS
Robert E. Moore, Wilmington, Del., assignor to
Sun Oil Company
No Drawing. Filed Feb. 26, 1969, Ser. No. 802,661
Int. Cl. C07c *39/12*
U.S. Cl. 260—619B                         3 Claims

ABSTRACT OF THE DISCLOSURE

Bisphenols of the structure

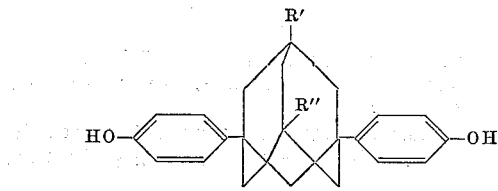

where R' and R" are hydrogen or a hydrocarbon radical are prepared by reacting a compound of the structure

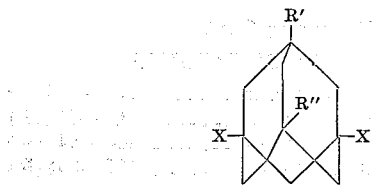

where X is bromo or chloro with phenol at reflux for several hours. The adamantane bisphenols are useful for preparing polyesters and polycarbonates as films or coating which have unusually high thermal stability.

---

The present invention relates to novel bisphenols containing an adamantane moiety.

Adamantane (tricyclo[3.3.1.1$^{3,7}$]decane) has a carbon structure containing ten carbon atoms arranged in a completely symmetrical, strainless manner and is often described as a cage-like structure which consists of three condensed cyclohexane rings. There are four bridgehead carbon atoms which are equivalent to each other as are the rings. The adamantane structure is often depicted by:

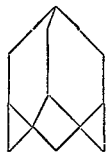

In the process of the present invention the adamantane compound employed will have the structure

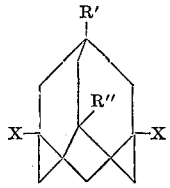

where R' and R" are radicals having 0–20 carbon atoms selected from the group consisting of hydrogen and hydrocarbyl. The term hydrocarbyl as used herein described a monovalent hydrocarbon radical. Such hydrocarbyl radicals can be selected from the group consisting of alkyl, cycloalkyl, aryl, alkaryl and aralkyl and X is bromo or chloro. A preferred adamantane reactant is one in which at least one of R' and R" is a hydrocarbyl radical and most preferred is one where both R' and R" are hydrocarbyl radicals having 1–20 carbon atoms, although the number of carbon atoms in each substituent radical can range up to 20, it is generally preferred that each radical contain no more than 10 carbon atoms. Of this latter class of radicals, the most preferred are methyl and ethyl groups because of the ease with which 1,3-dimethyl and diethyl-adamantanes are obtained.

The adamantane hydrocarbons are well known and their preparation is adequately described in the literature.

The dihalo derivatives can be prepared by reacting the corresponding adamantane hydrocarbon with chlorine or bromine in the presence of AlCl$_3$ or AlBr$_3$ as disclosed in Stetter and Wulff, German Pat. No. 101,410 and Stetter in Agnew Chem., International Edit., vol. 1 (1962), No. 6, pages 287–288. The mixed bromo-chloro adamantane can be obtained by reacting a dibromo adamantane with a chlorine donor such as carbon tetrachloride in the presence of a Lewis acid catalyst as shown in the copending application of Robert E. Moore, Ser. No. 688,679, filed Dec. 7, 1967.

Examples of some suitable reactants are the bridgehead dichloro, dibromo or bromo-chloro derivatives of the following hydrocarbons: adamantane, 1-methyladamantane; 1-ethyladamantane; 1,3-dimethyladamantane; 1-methyl-3-ethyladamantane; 1,3 - diethyladamantane; 1-n-propyladamantane; 1-isopropyladamantane; 1-n-butyladamantane; 1,3-di-n-pentyladamantane; 1 - methyl-3-heptyladamantane; 1-n-decyladamantane; 1-n-decyl-3-ethyladamantane; 1-methyl-3-propyladamantane; 1 - isohexyladamantane; 1-methyl-3-cyclohexyladamantane; 1-phenyladamantane; 1,3-diphenyladamantane; 1-p-tolyladamantane; 1-benzyladamantane and the like.

Briefly stated the present invention is a process for preparing a composition of the structure

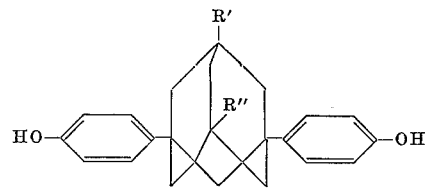

comprising contacting a compound of the structure

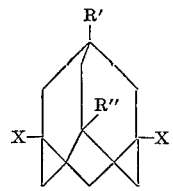

with phenol at a temperature in the range of 125° C. to 200° C. where R' and R" are radicals having 0–20 carbon atoms selected from the group consisting of hydrogen and hydrocarbyl and each X is independently selected from the group consisting of bromo and chloro. The reaction time will vary particularly in regard to the temperature employed from 4 to 10 hours. In practice the preferred procedure is to carry out the reaction at reflux which is around 178–185° C. (B.P. phenol 182° C.). At reflux the reaction requires 5 to 7 hours for good yields. No catalyst is required. The reaction takes place in an excess of phenol which also serves as the solvent for the adamantane reactant and the product. The adamantane bisphenol is most easily recovered by cooling the reaction mixture and pouring it into warm water (66–80° C.) thus precipitating the bisphenol and dissolving the phenol. The crystalline material is filtered and recrystallized for example, from xylene, toluene or isopropanol-water.

The adamantane bisphenols of the present invention can be employed as the prior bisphenols to prepare polyesters, polycarbonates and epoxides. However, the polymers prepared from the present adamantane bisphenols have significantly improved thermal stability due to their high glass transition temperatures. This can be seen Table I below comparing the properties a prior art polycarbonate and one prepared from an adamantane bisphenol.

TABLE I.—POLYCARBONATE PROPERTIES

| Bisphenol | 2,2-bis(4-hydroxyphenyl)propane. | 1,3-bis(4-hydroxyphenyl) 5,7-dimethyladamantane. |
|---|---|---|
| Glass transition, Tg, °C.: | | |
| (DTA) | 150 | |
| (DSC) | | 225–240 a. |
| Melting temp., °C | 220–230 | Stable to 300. |
| Inherent viscosity, 0.5 g./dl. at 100° F. in methylene chloride. | 0.59 | 0.69. | a Tg could not be clearly defined but was within the range 225–240.

The following example is presented to further illustrate the invention.

EXAMPLE 32.2 grams (0.1 mole) of 1,3-dibromo-5,7-dimethyladamantane and 250 cc. of phenol were charged to a 500 ml, round-bottom flask equipped with a condenser. The flask was swirled to dissolve the dibromo adamantane. The flask and contents were then heated under reflux (~180° C.) for several hours (5–6 hrs.). After the evolution of HBr had subsided, the reaction mixture was cooled, poured into warm water (~75° C.) and stirred to dissolve phenol. A white crystalline material precipitated and was recovered by filtration. The product 29.6 grams (85% theoretical) was recrystallized from toluene. It was identified by I.R., Mass Spectroscopy and N.M.R. as 1,3-bis(4-hydroxyphenyl) 5,7-dimethyladamantane. Its properties are set out in Table II.

TABLE II

| | |
|---|---|
| Molecular wt. | 348 |
| Melting point, °C. | 223–223.5 |
| Heat of fusion, cal./mole | 9840 |
| Entropy of fusion, e.v. | 2.0 |
| Cryoscopic constant | 17.4 |

The invention claimed is:

1. A composition of matter having the structure

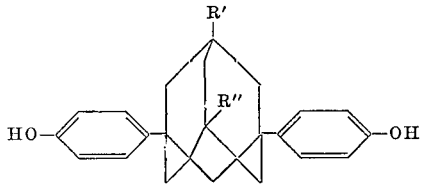

where R' and R" are radicals alkyl of 1–10 C atoms, cyclohexyl, phenyl, tolyl and benzyl selected from the group consisting of hydrogen.

2. The composition according to claim 1 wherein R' and R" are selected from the group consisting of methyl and ethyl.

3. The composition according to claim 2 wherein R' and R" are methyl.

References Cited

UNITED STATES PATENTS

| 3,342,880 | 9/1967 | Reinhardt | 260—611(F) |
| 3,383,423 | 5/1968 | Moore | 260—611(F) |
| 3,485,880 | 12/1969 | Schneider | 260—648(R) |
| 3,522,306 | 7/1970 | Driscoll | 260—648(R) |

BERNARD HELFIN, Primary Examiner

U.S. Cl. X.R.

260—47XA